(12) United States Patent
Witkowski et al.

(10) Patent No.: US 6,179,654 B1
(45) Date of Patent: *Jan. 30, 2001

(54) BUMPER MOUNTED CORD SET

(75) Inventors: Ireneusz Witkowski; Claudio Zubin, both of Winnipeg (CA)

(73) Assignee: Phillips & Temro Industries Ltd. (CA)

(*) Notice: Under 35 U.S.C. 154(b), the term of this patent shall be extended for 0 days.

This patent is subject to a terminal disclaimer.

(21) Appl. No.: 09/470,476

(22) Filed: Dec. 22, 1999

Related U.S. Application Data (63) Continuation of application No. 09/092,527, filed on Jun. 5, 1999, now Pat. No. 6,039,602.

(51) Int. Cl.$^7$ ............................. H01R 13/73; H01R 1/01
(52) U.S. Cl. ............................................. 439/550
(58) Field of Search ............................. 439/550, 551, 439/136, 135, 369, 350–357; 174/66, 67

(56) References Cited

U.S. PATENT DOCUMENTS

| | | |
|---|---|---|
| 3,270,267 | 8/1966 | Nolte, Jr. . |
| 3,494,657 | 2/1970 | Tantlinger et al. . |
| 4,067,635 | 1/1978 | Solberg . |
| 4,106,834 | 8/1978 | Horowitz . |
| 4,829,223 | 5/1989 | Broberg et al. . |
| 4,917,625 | 4/1990 | Haile . |
| 4,940,423 | 7/1990 | Aihara et al. . |
| 4,971,576 | 11/1990 | Thimmesch . |
| 5,066,247 | 11/1991 | Watson . |
| 5,080,603 | 1/1992 | Mouissie . |
| 5,124,506 | 6/1992 | Briggs et al. . |
| 5,382,179 | 1/1995 | Noschese . |
| 5,538,439 | 7/1996 | Fell et al. . |
| 5,588,853 | 12/1996 | Anthony . |
| 5,885,098 | 3/1999 | Witkowski . |
| 6,039,602 | * 3/2000 | Witkowski et al. .................. 439/550 |

FOREIGN PATENT DOCUMENTS

| | | |
|---|---|---|
| 37 15358 A1 | 11/1998 | (DE) . |
| WO 96/36093 | 11/1996 | (WO) . |

OTHER PUBLICATIONS

Seven (7) sheets of photographic illustrations of a Calix cord set.
Calix assembly brochure (2 sheets).

* cited by examiner

Primary Examiner—Renee Luebke
Assistant Examiner—Antoine Ngandjui
(74) Attorney, Agent, or Firm—Harness, Dickey & Pierce, P.L.C.

(57) ABSTRACT

A cord set including a housing and a coupling mechanism adapted to couple the housing to a structure. The cord set includes a first cord having a first end connectable to a power source and a second end connected to a plug. The cord set also includes a second cord having a first end connectable to the electrical device and a second end connectable to the plug. The housing includes a body defining an axis, an outer surface and a cavity. A first embodiment of the coupling mechanism includes axially spaced ribs extending from an outer surface of the housing body and a snap ring connectable to the structure and the housing. A second embodiment of the coupling mechanism includes a peg protruding from the housing and a lock nut with a detent for coupling the peg to the lock nut. Finally, a third embodiment of the coupling mechanism includes a saddle and cup each having a ridge that cooperates with the axial spaced ribs to couple the housing to the automobile body.

15 Claims, 5 Drawing Sheets

BUMPER MOUNTED CORD SET

This is a continuation of U.S. patent application No. 09/092,527, now U.S. Pat. No. 6,039,602 filed Jun. 5, 1999.

BACKGROUND OF THE INVENTION

1. Technical Field

The present invention relates generally to electrically powered accessories for motor vehicles and, more particularly, to a cord set for such electrical powered accessories.

2. Discussion

Various electrically powered devices are designed for use with vehicles including automobiles, light-duty trucks, and heavy-duty vehicles. These devices, including cold weather starting devices such as radiant heaters, engine block heaters, fluid heaters, battery warmers, and the like, are generally fixed to the automobile body and operationally connected to an appropriate component of the vehicle engine. A factor in the sales and use of these devices is the simplicity with which the device can be electrically connected to the power source. To address this ease of use concern, cord sets have been developed that include a receptacle located on the vehicle body for mounting power cords that are connectable to the electrically powered device. The power cords of the cord sets terminate at a male or female plug that is coupled to a receptacle whereupon connection of the male or female plug to an appropriately configured counterpart plug external to the vehicle engine compartment allows selective electrical connection of the device to the power source.

While manufacturers have provided cord sets for selectively connecting electrically powered automotive accessories to an external power source, they have failed to address a variety of operational and assembly concerns. Specifically, one manufacturer utilizes a mounting device consisting of an externally threaded housing coupled to an internally threaded nut to connect the cord set to the vehicle. This approach requires the assembler to apply a specified torque to the nut and the nut is also inconveniently located on the inside surface of the body panel. Threaded fasteners also introduce the risk of compromising mounting integrity over time due to factors such as temperature variation and vibration.

Another mounting device includes an externally threaded housing used in conjunction with an expandable collar. To mount the cord set to the automobile, the housing is axially inserted into the expandable collar until the external thread of the housing engages an internal partial thread formed within the collar. To complete the mounting process, the housing must be rotated several complete rotations in order to expand the collar into engagement with the automotive panel. While this mounting device offers the positive feature of only requiring access to the outside surface of the body panel, the process of screwing in the housing is time consuming and produces the undesirable result of a twisted cord. Additionally, the final orientation of the housing and cover is not positively defined allowing misinstallation and possible contaminant ingress.

In view of the above concerns, as well as the automotive market's structural integrity requirements, a need exists for a simple, robust cord set that may be easily installed in a variety of applications.

SUMMARY OF THE INVENTION

Accordingly, the present invention relates to a cord set that addresses the above deficiencies in the art and that meets the installation and structural integrity requirements for use in the automotive market. More particularly, the cord set of the present invention includes a housing and a coupling mechanism adapted to couple the housing to a structure. The cord set includes a first cord having a first end connectable to a power source and a second end connected to a plug. The cord set also includes a second cord having a first end connectable to the electrical device and a second end connectable to the plug. The housing includes a body defining an axis, an outer surface and a cavity. A first embodiment of the coupling mechanism includes axially spaced ribs extending from an outer surface of the housing body and a snap ring connectable to the structure and the housing. A second embodiment of the coupling mechanism includes a peg protruding from the housing and a lock nut with a detent for coupling the peg to the lock nut. Finally, a third embodiment of the coupling mechanism includes a saddle and cup each having a ridge that cooperates with the axial spaced ribs to couple the housing to the automobile body.

BRIEF DESCRIPTION OF THE DRAWINGS

Other objects and advantages of the invention will become apparent to one skilled in the art upon reading the following specification and subjoined claims and upon reference to the drawings in which:

DETAILED DESCRIPTION

Figure 1:
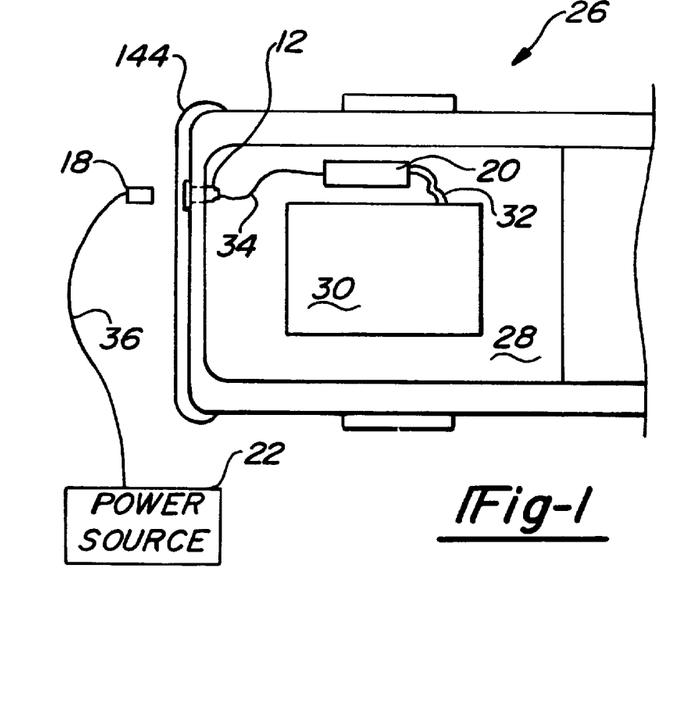
FIG. 1 is a top plan view of a cord set according to the present invention for use with an automobile.

FIG. 1 illustrates a specific environment in which a cord set 10 of the present invention is contemplated for use wherein an automobile accessory 20 is mounted to an automobile 26 such as within an engine compartment 28 thereof. It should be noted that automobile accessory 20 is intended to be fixed to an appropriate support structure on the automobile body and operationally coupled to an appropriate component of a vehicle engine 30 such as through the use of a heating element or equivalent component generally illustrated by reference numeral 32. In the present invention, a first cord 34 electrically connects prongs 16 (FIG. 3) to automobile accessory 20. A second cord 36 electrically connects a plug 18 to a power source 22. By this arrangement, plug 18 may be mated with prongs 16 within a housing 12 to selectively electrically connect electrical automobile accessory 20 to power source 22 without requiring direct access to the engine compartment of the vehicle.

Figure 2:
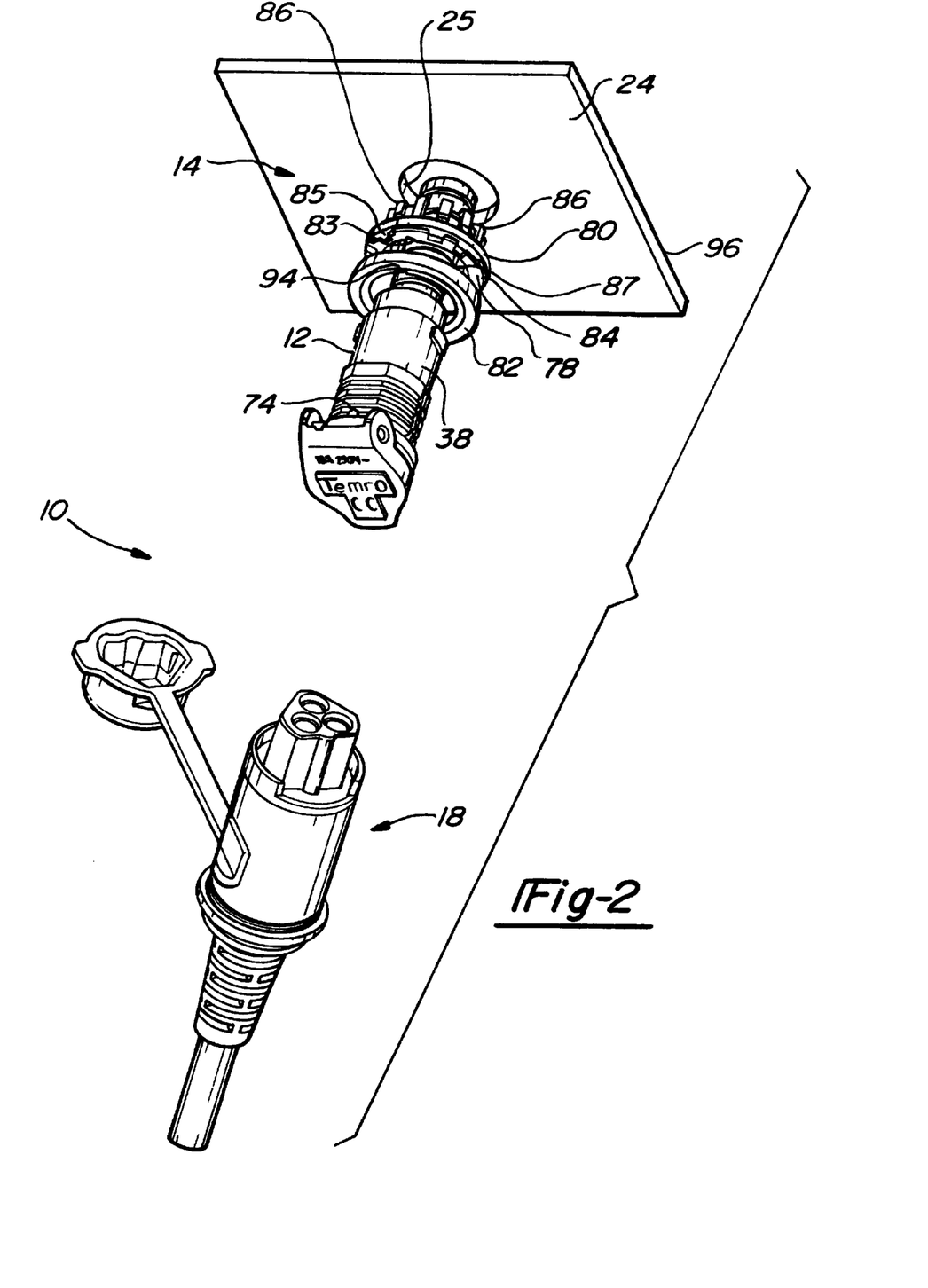
FIG. 2 is a perspective view of a cord set according to the present invention.
Figure 3:
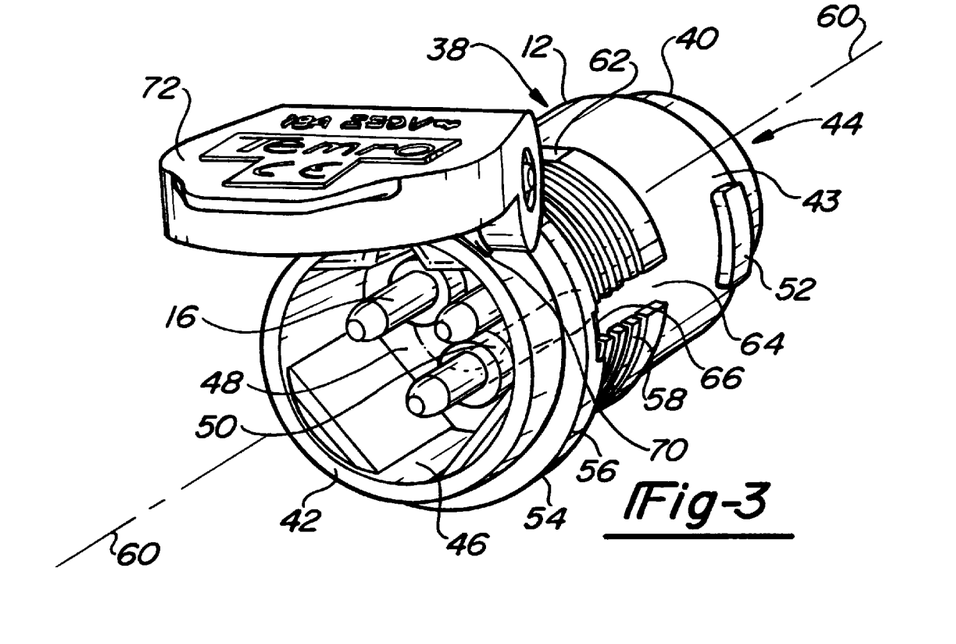
FIG. 3 is a front perspective view of the housing illustrated in FIG. 1.

The following description of the preferred embodiments of the present invention is merely exemplary in nature and is not intended to limit the scope of the invention as defined by the appended claims. With reference to FIG. 2, cord set 10 of the present invention is illustrated to include a housing 12, a coupling mechanism 14, first cord 34, second cord 36 and plug 18. Prongs 16 are illustrated in FIG. 3 as being male electrical components cooperative with female plug 18 for electrically connecting the electrical automobile accessory 20 to power source 22 (FIG. 1). Those skilled in the art will further appreciate that while the preferred embodiment of cord set 10 includes male prongs 16, the cord set could include a female plug such as that referenced in the drawings by numeral 18 in lieu of the male prongs without departing from the scope of the invention as defined by the appended claims.

Figures 9, 10, 11, 12:
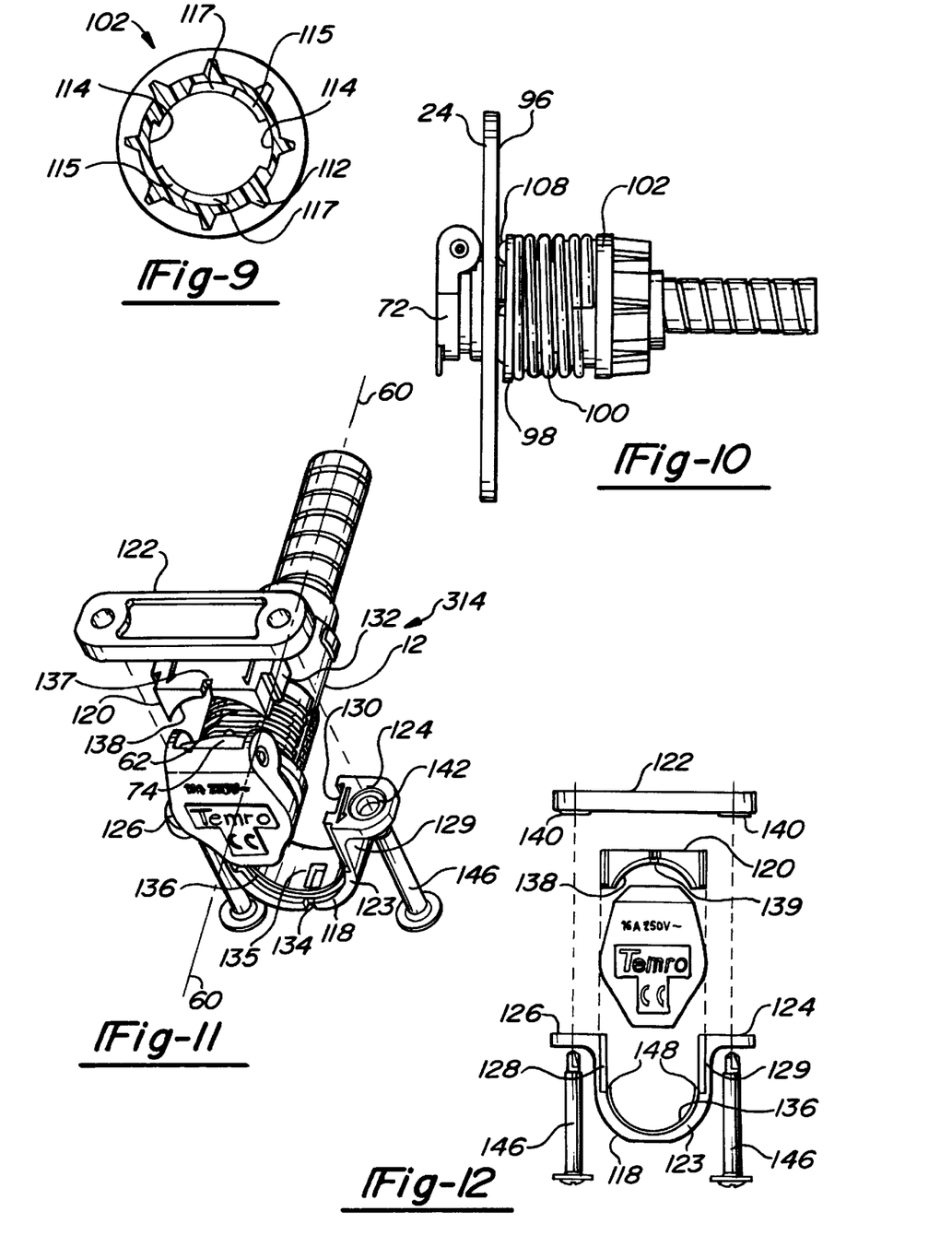
FIG. 9 is a perspective view of the lock ring.
FIG. 10 is a side elevational assembly view of a second embodiment of the cord set coupling mechanism.
FIG. 11 is an exploded perspective view of a third embodiment of the cord set coupling mechanism.
FIG. 12 is an exploded front view of a third embodiment of the cord set coupling mechanism.

As described in greater detail hereinafter, coupling mechanism 14 provides for removable coupling of housing 12 to an automotive body panel 24. Three embodiments of coupling mechanism 14, 214, and 314, respectively, are illustrated and described herein. The first embodiment, i.e., coupling mechanism 14, is a face mount coupling mechanism which is described in, and illustrated with reference to, FIGS. 2, 5, and 6. Coupling mechanism 214 is illustrated in FIGS. 7, 8, 9, and 10. Finally, coupling mechanism 314 is a suspension mount mechanism which is shown in FIGS. 11 and 12. Those skilled in the art will appreciate from the drawings and related descriptions that housing 12 is configured to cooperate with each of coupling mechanisms 14, 214, and 314 in a manner that reduces the difficulty of installation while increasing the structural integrity of cord set 10 when compared to prior art cord set configurations. Moreover, by providing a housing 12 that is mountable through the use of each of coupling mechanisms 14, 214, and 314, the present invention provides mounting flexibility not present in the prior art.

Figure 4:
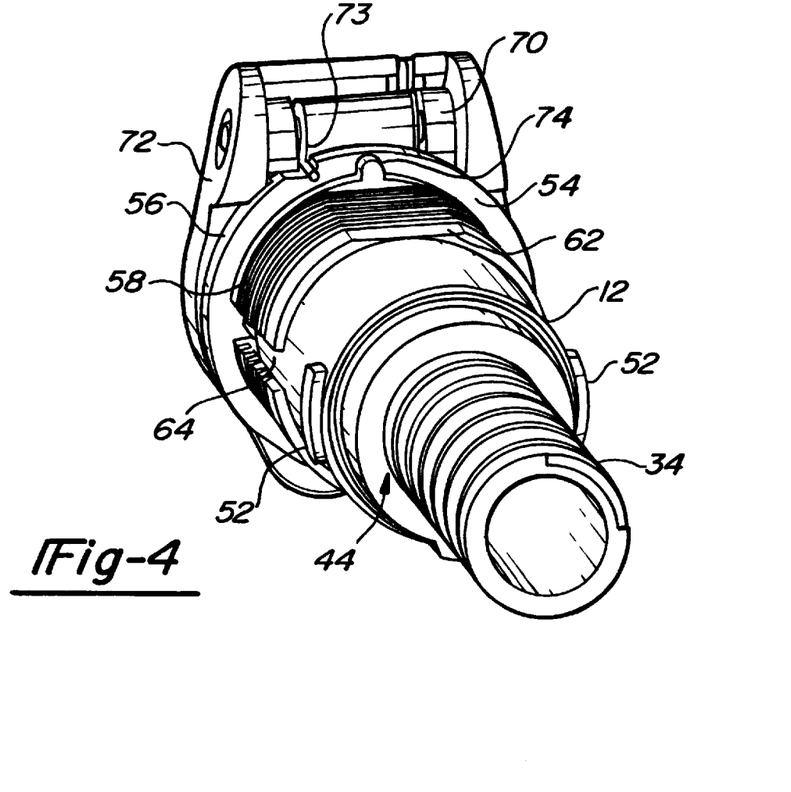
FIG. 4 is a rear perspective view of the housing illustrated in FIG. 1.

As best illustrated in FIGS. 3 and 4, housing 12 includes a generally tubular-shaped body 38 with a first end 40, a second end 42 and an outer surface 43. Housing 12 includes a cord aperture 44 and cavity 46 initiating from first end 40 and second end 42, respectively. Cord aperture 44 and cavity 46 are separated by interior wall 48. Prong apertures 50 extend through interior wall 48 connecting cavity 46 to cord aperture 44. A pair of pegs 52 protrude from surface 43 of body 38 a predetermined distance from mounting face 54 of flange 56. Pegs 52 are provided for mounting housing 12 to the automobile body in a manner hereinafter described.

Body 38 further includes a set of circumferential ribs 58 positioned adjacent to mounting face 54 and aligned to have a zero degree pitch angle in relation to a housing axis 60. Circumferential ribs 58 are interrupted by a pair of flats 62 and a pair of grooves 64 positioned about the circumference of body 38, each of which axially extend into flange 56 terminating at a groove face 66. Housing 12 also includes hinge stantions 70 for mounting cover 72. As shown in FIG. 4, spring 73 biases cover 72 towards the closed position depicted in the figure. Finally, housing 12 includes a key 74 protruding from body 38 adjacent to mounting face 54. One skilled in the art will appreciate that key 74 is but one method of creating an asymmetrical housing 12 for later assembly in automotive body panel 24.

In reference to FIGS. 1, 2, 5, and 6, face mount coupling mechanism 14 is detailed for coupling housing 12 to automotive body panel 24 such as an automobile bumper 144. A significant advantage of the face mount system is that access to an inside surface 96 of automotive body panel 24 is not required. Installation is simplified to the level of merely aligning the components and pushing them together.

Figure 5:
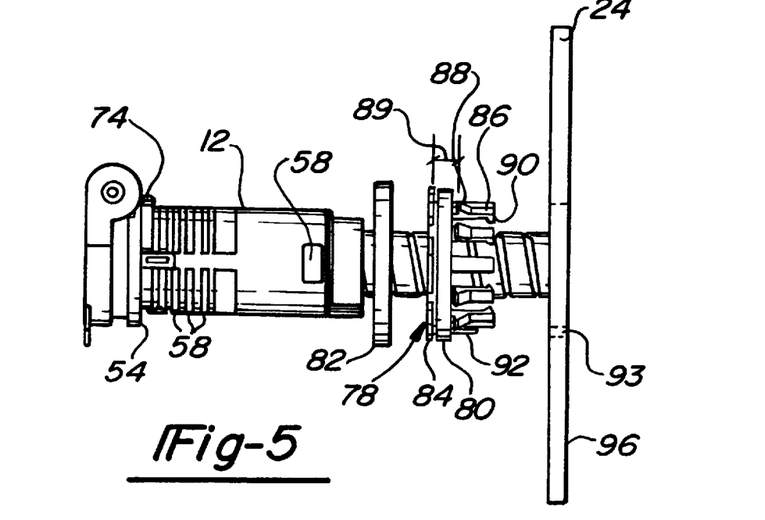
FIG. 5 is an exploded side elevational view of a first embodiment of the cord set coupling mechanism.
Figures 6, 7, 8:
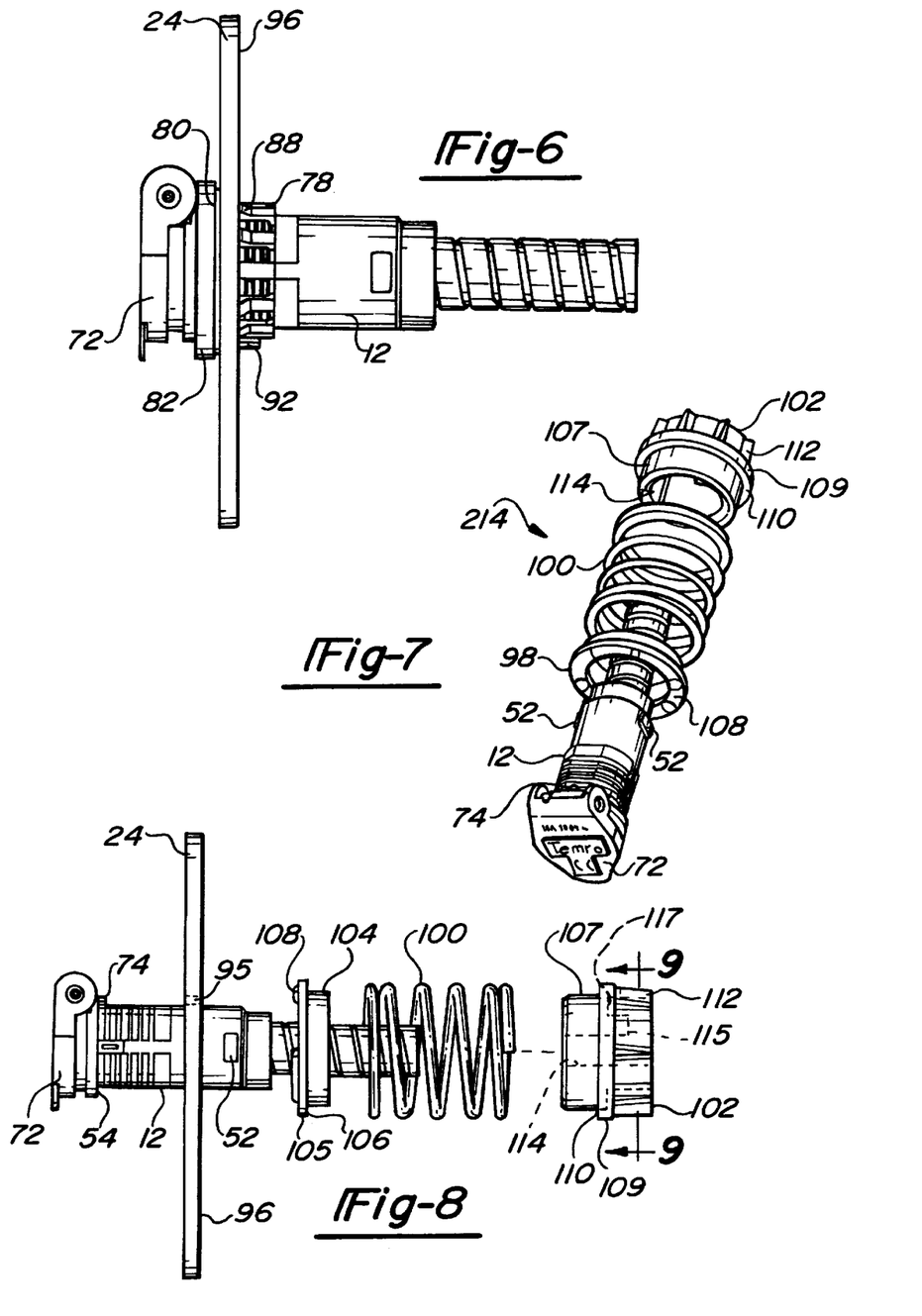
FIG. 6 is a side elevational assembly view of a first embodiment of the cord set coupling mechanism.
FIG. 7 is an exploded perspective view of a second embodiment of the cord set coupling mechanism.
FIG. 8 is an exploded side elevational view of a second embodiment of the cord set coupling mechanism.

Face mount coupling mechanism 14 includes a snap ring 78, a seal 80 and an end cap 82. Snap ring 78 includes a stop flange 84 circumscribing a passage 87 and a plurality of axially extending fingers 86 positioned circumferentially about snap ring 78. Several of the extending fingers 86 include radially outwardly extending tabs 88 for engagement with automotive body panel 24. One skilled in the art will note that outwardly extending tabs 88 are positioned a distance 89 from stop flange 84. While distance 89 may vary depending upon the anticipated application of cord set 10, it is contemplated that distance 89 is within the range of about 2 millimeters (mm). to about 10 mm. and more preferably about 5 mm. for effectively coupling housing 12 to many automobile bumpers. In order to increase the usefulness of the present invention on a variety of automobiles 26 with varying automotive body panel thicknesses, seal 80 is formed of a compressible material such as foam rubber and positionable between automotive body panel 24 and snap ring 78 such that seal 80 compresses between flange 84 and panel 24 as axially extending fingers 86 are being snap fit into automotive body panel 24.

In the illustrated embodiment, each of axially extending fingers 86 further include inwardly extending shoulders 90 for engagement with circumferential ribs 58 on housing 12 as illustrated in, and hereinafter described with reference to, FIGS. 2, 5, and 6. Snap ring 78 further includes projection 92 extending radially from one of axially extending fingers 86. Projection 92 cooperates with a keyway 93 that is formed in automotive body panel 24 during or prior to installation of cord set 10. Projection 92 along with end cap 82 and housing 12 form an anti-rotational device that assures proper alignment of housing 12 and cover 72 throughout the useful life of cord set 10. Specifically, snap ring 78 includes an asymmetric pattern of cut outs 85 within stop flange 84 that cooperate with a set of projections (not shown) on end cap 82 thereby rotationally aligning the flange and ring. Finally, key 74 of housing 12 is configured for mating engagement with aperture 94 of end cap 82 and opening 83 of snap ring 78.

Attachment of housing 12 to automotive body panel 24 is facilitated by two separate snap-fit operations which will now be described with reference to FIGS. 2, 5, and 6. During the first snap fit, projection 92 is aligned with keyway 93 in automotive panel 24 as suggested above and shown in FIGS. 2 and 5. Next, an external force is supplied to displace snap ring 78 toward aperture 25 of auto body panel 24, thereby deforming axially extending fingers 86 inwardly as outwardly extending tabs 88 pass through aperture 25. During this operation, seal 80 is compressed until outwardly extending tabs 88 pass through aperture 25. Axially extending fingers 86 are then released and outwardly extending tabs 88 engage with inside surface 96 of auto body panel 24.

The second snap fit occurs by aligning housing 12 relative to snap ring 78 and axially displacing housing 12 toward panel 24 through passage 87 of snap ring 78. Those skilled in the art will appreciate that this displacement moves axially extending fingers 86 outwardly as inwardly extending shoulders 90 pass over circumferential ribs 58. Displacement of housing 12 continues until mounting face 54 abuts end cap 82 and end cap 82 abuts snap ring 78. At this point, inwardly extending shoulders 90 have passed at least one of the circumferential ribs 58. Upon release of the external force, the resiliency of seal 80 urges housing 12 axially away from panel 24 in a direction opposite that of installation until inwardly extending shoulders 90 engage circumferential ribs 58, thereby retaining housing 12 in place. The completed assembly is illustrated in FIG. 6.

As best shown in FIGS. 7–10, a second embodiment of the coupling mechanism, referenced by numeral 214, is configured to couple housing 12 to the automobile and includes a contact ring 98, a coil spring 100 and a lock ring 102. Contact ring 98 is a generally washer-shaped member having an axial sleeve 104, a flange 105 forming spring seat 106, and lugs 108. Lugs 108 are spaced circumferentially about flange 105 to assure contact of at least three points of contact ring 98 with inside surface 96 of automotive body panel 24. Lock ring 102 is a cylindrical member including a spring seat 110, sleeve 107, fins 112 and an internal groove 114 shaped to cooperate with pegs 52 of housing 12 as hereinafter described.

To secure housing 12 to automotive body panel 24 using second embodiment coupling mechanism 214, housing 12 is inserted into aperture 25 (FIG. 2) such that key 74 cooperates with keyway 95 that is formed in automotive body panel 24 during or prior to installation of cord set 10. Contact ring 98, spring 100 and lock ring 102 are positioned behind automotive body panel 24 as shown in FIG. 8. Lock ring 102 is oriented relative to housing 12 such that internal grooves 114 align with pegs 52 as shown in FIGS. 7 and 8. After aligning internal groove 114 with pegs 52, an external force is supplied to displace lock ring 102 toward mounting face 54 of housing 12, thereby compressing spring 100. Spring 100 is compressed until pegs 52 pass a guide face 115. Lock ring 102 is then rotated to trap pegs 52 along a detent face 117 thereby securing housing 12 to automotive body panel 24 (FIGS. 8 and 9). One skilled in the art will appreciate avoidance of the use of a threaded fastener and the corresponding issues of vibratory loosening. After assembly of lock ring 102 as shown in FIG. 10, spring 100 is in a state of compression thereby resisting vibratory loosening of housing 12 while key 74 restricts rotational movement of housing 12 during service.

A third embodiment of the coupling mechanism is shown in FIGS. 11 and 12 and referred to by reference numeral 314. Coupling mechanism 314 includes a saddle 118 and a cup 120. As is described in detail below, housing 12 is configured to seat in saddle 118 whereupon assembly of cup 120 to saddle 118 secures housing 12 thereto and to prevent axial movement of the housing.

Saddle 118 includes a generally U-shaped body 123 that cooperates with housing 12, mounting flanges 124 and 126, and walls 128 and 129 interconnecting the flanges and body 123. As shown, flanges 124 and 126 extend outwardly from vertical walls 128 and 129. Body 123 defines an inner seat 135 from which a ridge 136 protrudes for engagement with housing 12 between circumferential ribs 58, to restrict axial movement of housing 12. Saddle 118 also includes vertical walls 128 and 129 each with dovetail slots 130 shaped to accommodate dovetail keys 132 of cup 120. Saddle 118 further includes a notch 134 that cooperates with key 74 of housing 12 to resist rotational movement of housing 12 when the housing is coupled to saddle 118 in a position rotated 180 degrees from that shown in FIG. 11.

Cup 120 includes notch 137 and ridge 138 for coupling housing 12 to the automobile. Notch 137 engages key 74 of housing 12 when the coupling components are oriented in the manner as shown in FIG. 11. Those skilled in the art will appreciate that, as mentioned above, housing 12 may be oriented in alternative positions relative to saddle 118 and cup 120 by rotating saddle 118 and cup 120 about axis 60 and relative to housing 12 in 90 degree increments. These alternate orientations allow coupling mechanism 314 to be used in a variety of applications without use of additional components.

Dog 139 is located rearward of ridge 138 and protrudes from an inner surface of cup 120 for engagement with one of several depressions including flats 62 or grooves 64. Depending on the rotational position of cup 120 relative to housing 12, one of flats 62 or grooves 64 (FIG. 4) cooperates with dog 139 to prevent housing 12 from rotating relative to saddle 118 and cup 120. Those skilled in the art will appreciate that dog 139 may be formed on saddle 118 either in combination with or in lieu of the dog on cup 120 to prevent rotation of the housing.

Coupling mechanism 314 may also include a cap 122 as a spacer between saddle 118 and the automobile to assure clearance between cover 72 and the automobile when mounted. Cap 122 also includes bosses 140 shaped to compliment recesses 142 of mounting flanges 124 and 126 for alignment of the above-mentioned components during assembly.

It is specifically contemplated that housing 12 is positionable in a convenient location relative to the vehicle body such as proximate to a bumper 144 or a grill (not shown) thereof as shown in FIG. 1. Preferably, second end 42 of housing 12 is placed flush with or proximate to the grill or bumper of the automobile. Applicant's invention offers mounting flexibility regarding axial positioning of housing 12 in that the installer may choose to locate ridge 136 of saddle 118 between any two of the plurality of circumferential ribs 58. Saddle 118, cup 120, and optionally cap 122 are then secured to the bumper or grill of the automobile using screws 146. Notwithstanding the above description, those skilled in the art will appreciate that a variety of fasteners may be used to secure the coupling mechanism to any appropriate support structure on an automobile or other device without departing from the scope of the invention as defined by the appended claims.

From the above description, those skilled in the art will appreciate that the cord set of the present invention allows a housing to be releasably coupled to an automobile body panel or other support structure. More particularly, the configuration of housing 12 allows the user to select any one of coupling mechanisms 14, 214, and 314 to secure the housing to an appropriate location and in an appropriate orientation relative to the vehicle body. Moreover, the coupling mechanisms of the invention allow mounting of the housing in convenient locations and within small envelopes of space with a minimal amount of effort whereupon accessory 20 may be electrically connected to a power source by disposing plug 18 in cavity 46 to electrically engage prongs 16.

Finally, while the cord set illustrated above is designed for use in a 250 volt power supply environment, the present invention is equally applicable for other power supplies. It should be appreciated by those skilled in the art that the various electrical requirements of electrical automotive accessory 20 (FIG. 2) will generally govern the size of cord 34 and therefore the size of housing 12.

Various other advantages of the present invention will become apparent to those skilled in the art after having the benefit of studying the foregoing text and the appended drawings, taken in construction with the following claims:

What is claimed is:

1. A cord set adapted to be coupled to a body for connecting an electrical device to a power source, said cord set comprising:
   a first cord having a first end, a second end, a first plug at said first end, and a second plug at said second end;
   a second cord having a first end connectable to the electrical device and a second end connectable to said second plug;
   a housing defining an axis, an outer surface and a cavity, said second end of said second cord coupled to said housing, said first end of said first cord disposable in said cavity for connection to said second cord; and a coupling mechanism including a cup and a saddle engaging said outer surface of said housing, said saddle having a generally U shaped body with a first wall spaced apart from a second wall, said first and second walls each including one of a slot and a key, said cup including the other of said slot and said key, said key disposable in said slot to resist deflection of said first and second walls from one another.

2. The cord set of claim 1 wherein said first wall includes one of a first slot and a first key, said first key and said first slot forming a first dovetail and wherein said second wall includes one of a second slot and a second key, said second key and said second slot forming a second dovetail after said first and second keys are disposed within said first and second slots.

3. The cord set of claim 2 wherein said first key is not disposable within said second slot.

4. The cord set of claim 1 wherein said housing includes axially spaced apart ribs cooperating with an inner seat formed on said body of said saddle.

5. The cord set of claim 4 wherein said inner seat includes a protruding ridge for engagement with said housing between said ribs.

6. The cord set of claim 1 wherein said saddle includes a flange adapted for mounting to the body.

7. The cord set of claim 6 wherein said coupling mechanism includes a cap for aligning said flange and said cup.

8. A cord set adapted to be coupled to a body for connecting an electrical device to a power source, said cord set comprising:
   a first cord having a first end, a second end, a first plug at said first end, and a second plug at said second end;
   a second cord having a first end connectable to the electrical device and a second end connectable to said second plug;
   a housing defining a cavity, said plug disposable in said cavity to electrically connect the electrical device to the power source; and
   a lock nut wherein one of said lock nut and said housing includes a peg protruding therefrom and wherein the other of said lock nut and said housing includes a groove adapted to slidably accommodate said peg.

9. The cord set of claim 8 wherein said groove extends to a detent face formed on one of said lock nut and said housing.

10. The cord set of claim 9 wherein said lock nut may be rotated to dispose said peg into engagement with said detent face.

11. The cord set of claim 10 further including a spring disposed between the body and said lock nut, said spring exerting a biasing force against said lock nut tending to urge said lock nut away from the body, said peg engaging said detent face to resist said biasing force of said spring.

12. A coupling mechanism for a cord set adapted to be coupled to a body for connecting an electrical device to a power source, said cord setting including a first cord having a first end, a second end, a first plug at said first end, and a second plug at said second end, a second cord having a first end connectable to the electrical device and a second end connectable to said second plug and a housing defining an axis, an outer surface and a cavity, said second end of said second cord coupled to said housing, said first end of said first cord disposable in said cavity for connection to said second cord, said coupling mechanism comprising:
   a cup; and
   a saddle adapted for engaging said outer surface of said housing, said saddle having a generally U shaped body with a first wall spaced apart from a second wall, said first and second walls each including one of a slot and a key, said cup including the other of said slot and said key, said key disposable in said slot to resist deflection of said first and second walls from one another.

13. The cord set of claim 12 wherein said saddle includes an inner seat formed on said body of said saddle and adapted for engaging said housing.

14. The coupling mechanism of claim 12 wherein said first wall includes one of a first slot and a first key and wherein said second wall includes one of a second slot and a second key, said first key and said first slot forming a first dovetail and second key and said second slot forming a second dovetail after said first and second keys are disposed within said first and second slots.

15. The cord set of claim 14 wherein said first key is not disposable within said second slot.

* * * * *

UNITED STATES PATENT AND TRADEMARK OFFICE
CERTIFICATE OF CORRECTION

PATENT NO. : 6,179,654 B1
DATED : January 30, 2001
INVENTOR(S) : Ireneusz Witkowski It is certified that error appears in the above-identified patent and that said Letters Patent is hereby corrected as shown below:

Title page
Item (63) Related Data lines 2-3 "June 5, 1999" should be -- June 5, 1998 --.

Column 1,
Line 4, "June 5, 1999" should be -- June 5, 1998 --.

Column 7,
Line 4, "(mm)." should be -- (mm.) --.
Line 14, make paragraph break after "and".

Signed and Sealed this

Eleventh Day of September, 2001

*Attest:*

NICHOLAS P. GODICI
*Attesting Officer*  *Acting Director of the United States Patent and Trademark Office*